US012255463B2

(12) United States Patent
Lee

(10) Patent No.: US 12,255,463 B2
(45) Date of Patent: Mar. 18, 2025

(54) PHOTOVOLTAIC POWER GENERATION SYSTEM

(71) Applicant: HANWHA SOLUTIONS CORPORATION, Seoul (KR)

(72) Inventor: Jeong Heum Lee, Pohang-si (KR)

(73) Assignee: Hanwha Solutions Corporation, Seoul (KR)

( * ) Notice: Subject to any disclaimer, the term of this patent is extended or adjusted under 35 U.S.C. 154(b) by 0 days.

(21) Appl. No.: 18/254,305

(22) PCT Filed: Nov. 12, 2021

(86) PCT No.: PCT/KR2021/016515
§ 371 (c)(1),
(2) Date: May 24, 2023

(87) PCT Pub. No.: WO2022/114624
PCT Pub. Date: Jun. 2, 2022

(65) Prior Publication Data
US 2024/0097452 A1 Mar. 21, 2024

(30) Foreign Application Priority Data
Nov. 27, 2020 (KR) .......................... 10-2020-0162484

(51) Int. Cl.
*H02J 3/38* (2006.01)
*H02J 3/32* (2006.01)
(Continued)

(52) U.S. Cl.
CPC ................ *H02J 3/388* (2020.01); *H02J 3/32* (2013.01); *H02J 7/00034* (2020.01);
(Continued)

(58) Field of Classification Search
CPC .... H02J 3/388; H02J 7/00034; H02J 7/00712; H02J 3/32; H02J 7/0031; H02J 7/35; H02J 2207/20; H02J 2300/24
(Continued)

(56) References Cited

U.S. PATENT DOCUMENTS

| 6,838,611 | B2 * | 1/2005 | Kondo ..................... H02J 3/381 |
| | | | 136/244 |
| 7,193,872 | B2 * | 3/2007 | Siri ................... H02M 7/53803 |
| | | | 363/95 |

(Continued)

FOREIGN PATENT DOCUMENTS

KR 10-2011-0122937 A 11/2011
KR 10-2014-0034564 A 3/2014
(Continued)

OTHER PUBLICATIONS

Australian Office Action dated Mar. 28, 2024 issued in corresponding Australian Appln. No. 2021385628.
(Continued)

*Primary Examiner* — Alfonso Perez Borroto
(74) *Attorney, Agent, or Firm* — Harness, Dickey & Pierce, P.L.C.

(57) ABSTRACT

The present invention relates to a photovoltaic power generation system comprising: a plurality of PV modules; and a plurality of power generation efficiency optimization units, which are installed to correspond to the respective plurality of PV modules one-to-one, and include inverters to convert power produced from the plurality of PV modules into AC power, and thus supply the same to a power grid through an AC line.

3 Claims, 4 Drawing Sheets

(51) Int. Cl.
*H02J 7/00* (2006.01)
*H02J 7/35* (2006.01)

(52) U.S. Cl.
CPC ........ *H02J 7/0031* (2013.01); *H02J 7/00712* (2020.01); *H02J 7/35* (2013.01); *H02J 2207/20* (2020.01); *H02J 2300/24* (2020.01)

(58) Field of Classification Search
USPC .......................................................... 307/82
See application file for complete search history.

(56) References Cited

U.S. PATENT DOCUMENTS

| | | | | |
|---|---|---|---|---|
| 7,855,906 | B2* | 12/2010 | Klodowski | H02J 3/50 363/97 |
| 8,204,709 | B2* | 6/2012 | Presher, Jr. | H02S 50/10 702/88 |
| 8,710,699 | B2* | 4/2014 | Binder | H02J 7/00 307/64 |
| 8,780,592 | B1* | 7/2014 | Jones | H02M 1/44 363/39 |
| 9,547,033 | B1 | 1/2017 | Batten et al. | |
| 2013/0181527 | A1 | 7/2013 | Bhowmik | |
| 2014/0070619 | A1* | 3/2014 | Fornage | H02M 7/44 363/95 |
| 2014/0153303 | A1 | 6/2014 | Potharaju | |
| 2018/0351354 | A1* | 12/2018 | Galin | H02J 1/102 |
| 2024/0097452 | A1* | 3/2024 | Lee | H02S 50/00 |

FOREIGN PATENT DOCUMENTS

| | | |
|---|---|---|
| KR | 10-2016-0001249 A | 1/2016 |
| KR | 10-2018-0020555 A | 2/2018 |
| KR | 10-2034431 | 10/2019 |
| KR | 10-2019-0132849 A | 11/2019 |
| KR | 10-2020-0042453 A | 4/2020 |

OTHER PUBLICATIONS

Module-level power electronics (MLPE) for solar design: a primer [retrieved from the internet Mar. 28, 2024] <URL: https://aurorasolar.com/blog/module-level-power-electronics-mlpe-for-solar-design-a-primer/> published Oct. 18, 2018 as per wayback machine.
Photovoltaic Systems with Module-Level Power Electronics [retrieved from the internet Mar. 28, 2024] <URL: https://www.nrel.gov/docs/fy15osti/64876.pdf> published 2015.
International Search Report PCT/ISA/210 for International Application No. PCT/KR2021/016515 dated Feb. 23, 2022.
Extended European Search Report dated Sep. 25, 2024 issued in European Patent Application No. 21898450.8-1002.

* cited by examiner

[FIG. 1]
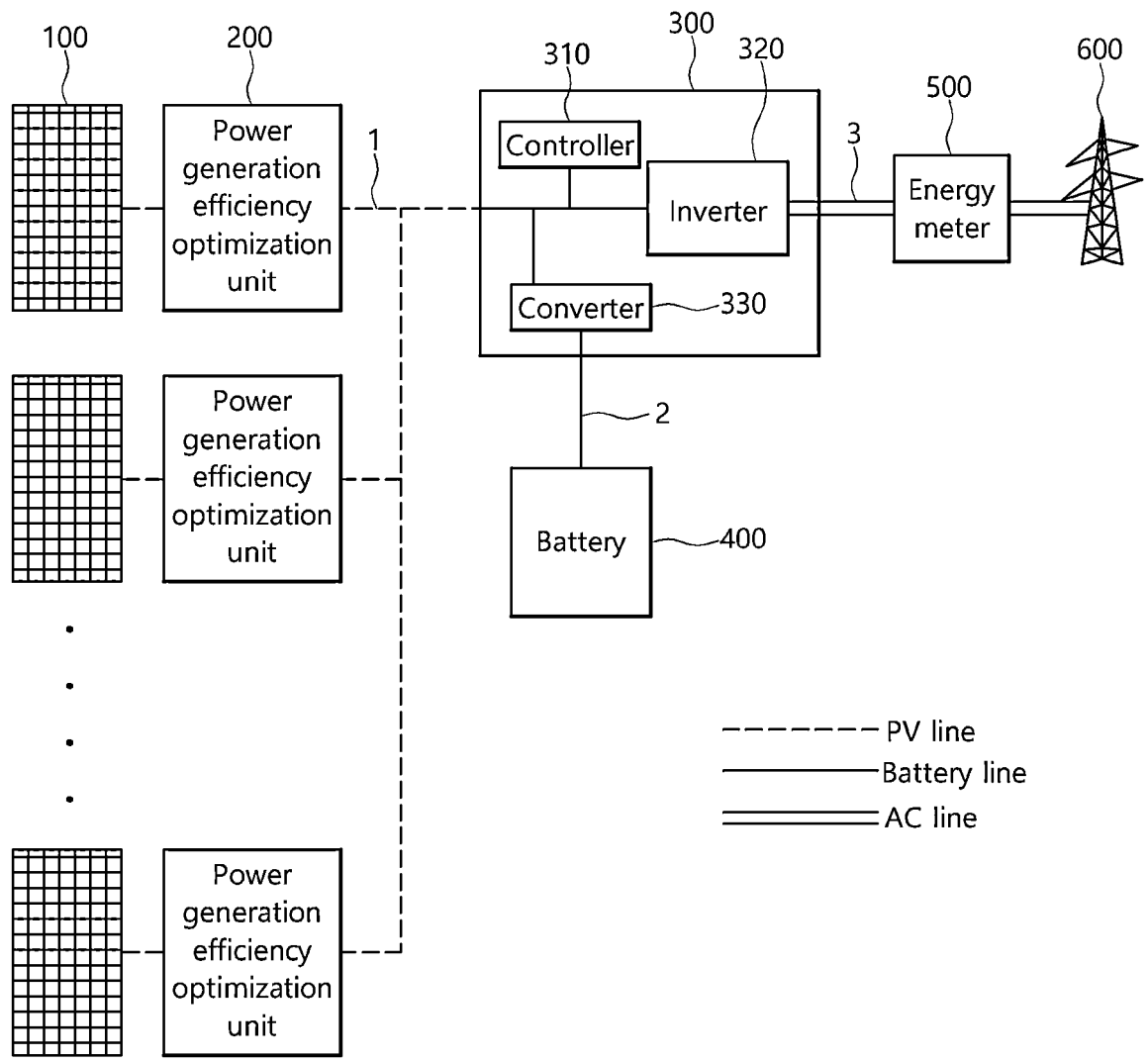
CONVENTIONAL ART

[FIG. 2]
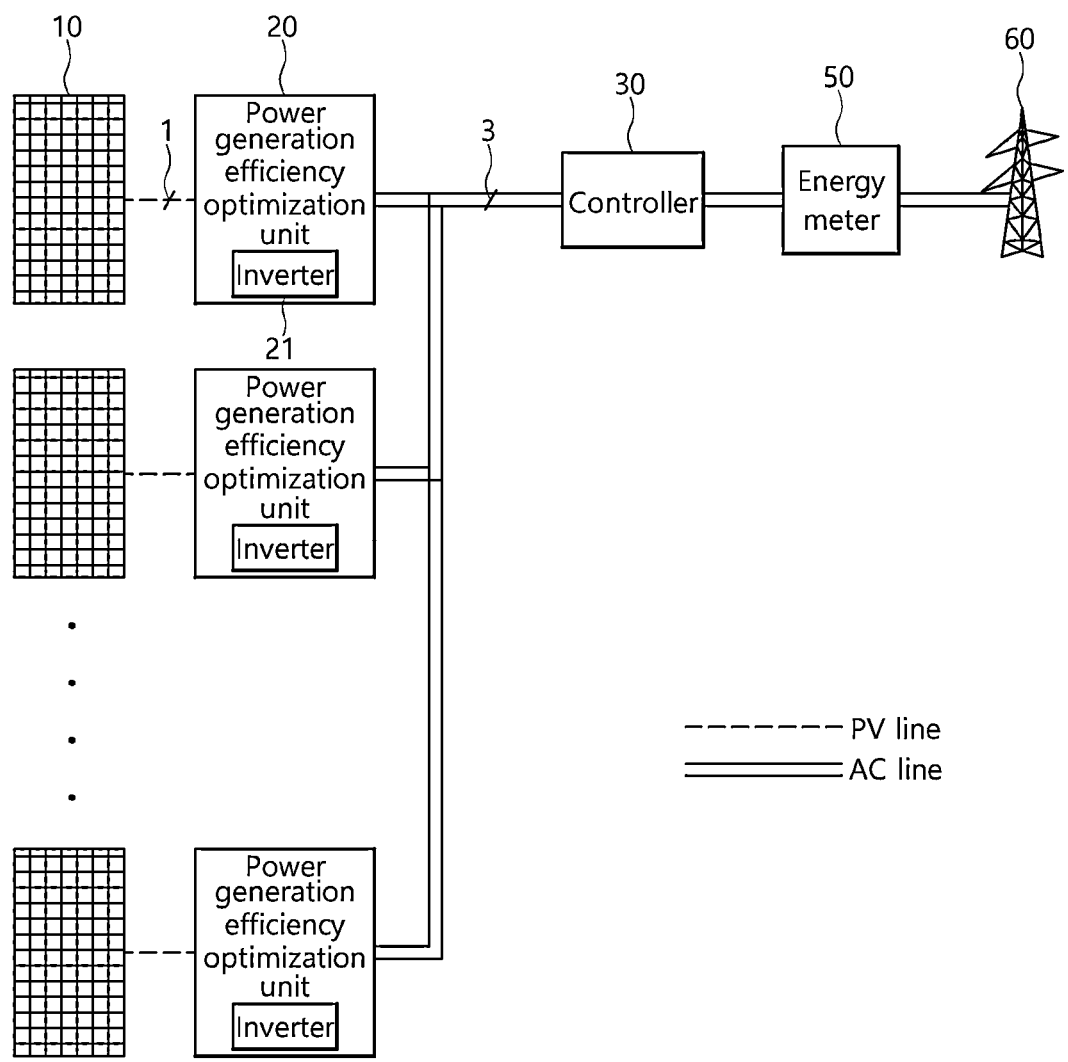

[FIG. 3]
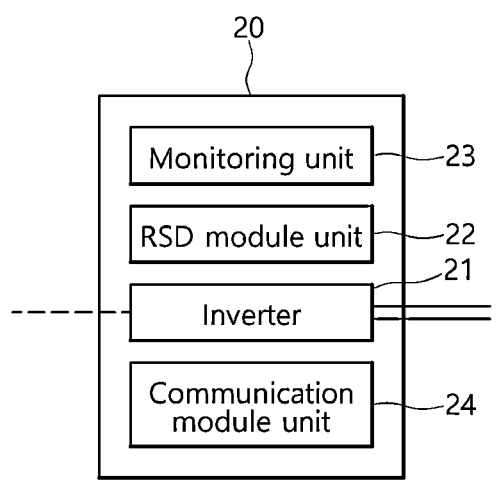

[FIG. 4]
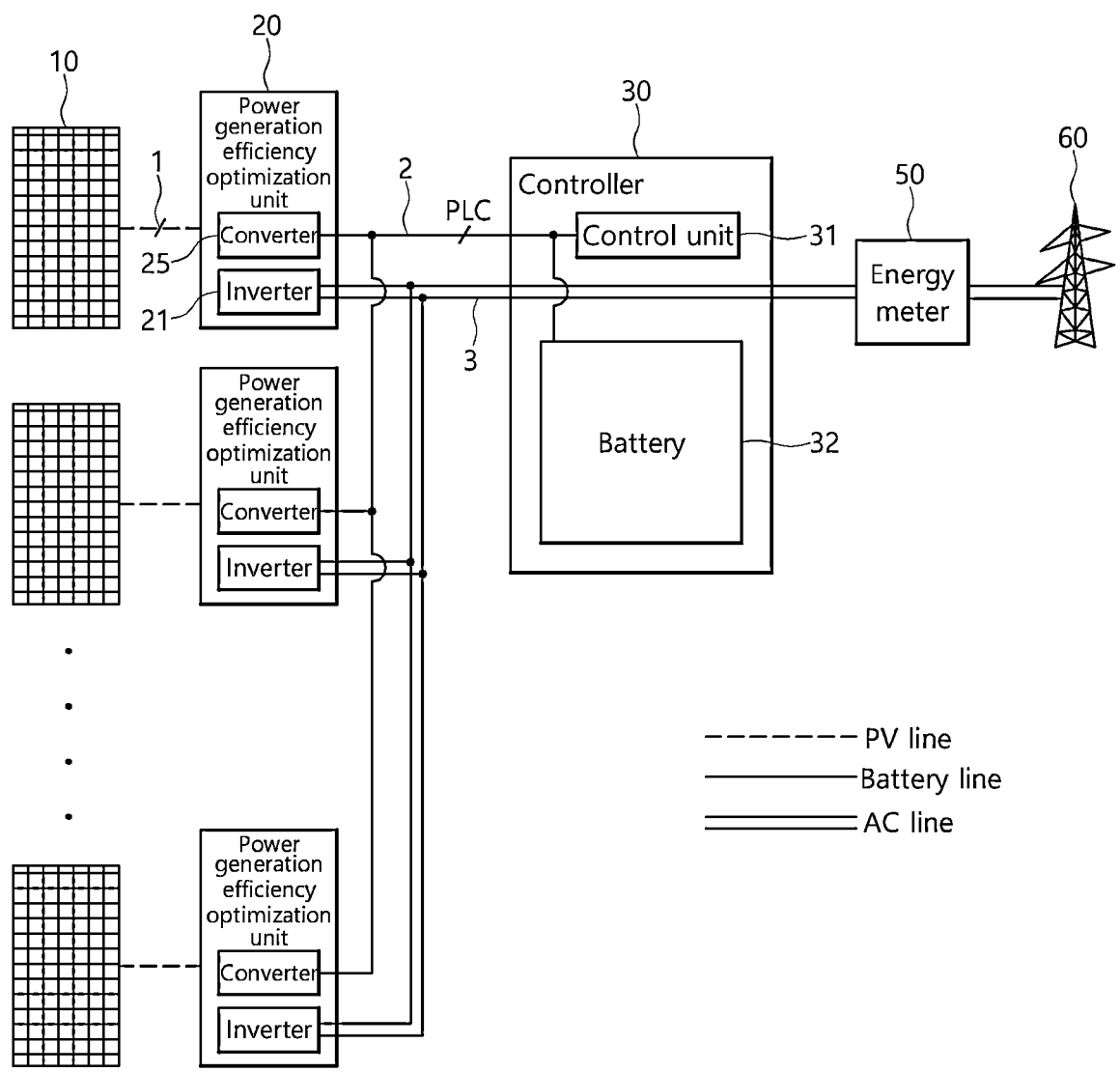

PHOTOVOLTAIC POWER GENERATION SYSTEM

CROSS-REFERENCE TO RELATED APPLICATIONS

This application is a national phase under 35 U.S.C. § 371 of PCT International Application No. PCT/KR2021/016515 which has an International filing date of Nov. 12, 2021, which claims priority to KR Application No. 10-2020-0162484, filed Nov. 27, 2020, the entire contents of each of which are hereby incorporated by reference.

TECHNICAL FIELD

The present invention relates to a photovoltaic power generation system, and more particularly, to a photovoltaic power generation system capable of efficient management.

BACKGROUND ART

Recently, there has been an increasing case of installing a photovoltaic panel in an apartment or a house and using power produced in a home or providing power to a power grid.

As an example of a photovoltaic power generation system, there is Korean Patent Registration No. 10-2034431 (registered on Oct. 11, 2019, Maximum Power Generation System of Solar Panel).

According to the contents described in the above Korean Patent, a power generation efficiency optimization unit (optimizer) is added to each of a plurality of solar cell panels, and a DC power produced in each solar cell panel is converted into an AC power by using one inverter.

The power generation efficiency optimization unit receives an output voltage reduction signal when the output voltage is higher than the maximum power point voltage of the solar cell panel from a control unit, operates in a buck mode to reduce the output voltage, and generates an output voltage increase signal when the output voltage is lower than the maximum power point voltage, transmits the generated output voltage increase signal to the power generation efficiency optimization unit, and operates in a boost mode to increase the output voltage.

However, since a conventional photovoltaic power generation system uses one inverter, when a failure occurs in the inverter, all production power cannot be converted.

In addition, as described in the above Korean Patent, the power generation efficiency optimization unit includes serial communication UAART, SPI, and I2C, and since various information such as voltage, current, temperature, and operation commands are transmitted and received through serial communication between the controller and each power generation efficiency optimization unit, a communication speed is relatively low.

FIG. 1 is a configuration diagram of a conventional photovoltaic power generation system.

Referring to FIG. 1, a conventional photovoltaic power generation system may include a plurality of PV modules 100, a power generation efficiency optimization unit 200 optimizing energy produced in each of the plurality of PV modules 100, and a power converter 300 communicating with the power generation efficiency optimization unit 200 and converting the energy produced in the PV module 100 to be stored in a battery 400 or converting the converted energy into an AC power and supplying the converted AC power to a power grid 600 through an energy meter 500.

The power generation efficiency optimization unit 200 performs an optimization function for maximum power production and monitors a state of each PV module 100 and provides the monitored state to the power converter 300, and performs an optimization according to a control of the power converter 300.

The power converter 300 includes a controller 310 and an inverter 320, and a converter 330 may be added as necessary. The addition of the converter 330 is determined according to whether the battery 400 is used.

In the drawings, household loads using electric power are omitted.

The energy produced in each PV module 100 is provided to the power generation efficiency optimization unit 200 through the PV line 1, and each power generation efficiency optimization unit 200 monitors a state of the PV module 100 corresponding to 1:1 and performs an optimization for controlling production power.

The energy produced in the PV module 100 may be provided to the power converter 300 through a PV line 1, and the DC electric energy supplied through the PV line 1 may be converted into AC electric energy through the inverter 320 and provided to the energy meter 500 through an AC line 3 and measured, and then may be supplied to the power grid 600.

In addition, when necessary, the power converter 300 may convert energy of each PV module 100 supplied through the PV line 1 into DC/DC energy through the converter 330 and then store the converted energy in the battery 400 through a battery line 2.

As described above, the controller 310 of the power converter 300 may perform serial communication with each power generation efficiency optimization unit 200 or perform power line communication (PLC) through the PV line 1.

In the conventional configuration, since each power generation efficiency optimization unit 200 shares one inverter 320, when a failure occurs in the inverter 320, it is impossible to supply power produced through the entire PV module 100 to the power grid 600.

Similarly, since each power generation efficiency optimization unit 200 shares one DC/DC converter, it is impossible to charge the battery 400 even when the DC/DC converter fails.

DISCLOSURE

Technical Problem

In consideration of the above problems, the present invention is directed to providing a photovoltaic power generation system capable of supplying energy to a power grid or performing charging to a battery even when there is an abnormality in a specific means by multiplexing a means for converting voltage.

Technical Solution

According to an aspect of the present invention, provided a photovoltaic power generation system, comprising: a plurality of PV modules; and a power generation efficiency optimization unit, which are installed to correspond to the respective PV modules one-to-one, and include inverters to convert power produced from the PV modules into AC power, and thus supply the same to a power grid through an AC line.

In an embodiment of the present invention, the power generation efficiency optimization unit may further include a converter configured to convert power produced by a PV module and charge the power to a battery through a battery line.

In an embodiment of the present invention, the power generation efficiency optimization unit may further include a monitoring unit configured to detect a state of the PV module; and a communication module unit configured to transmit information detected by the monitoring unit to a control unit of a controller.

In an embodiment of the present invention, the power generation efficiency optimization unit may further include a RSD module unit configured to perform rapid shut down (RSD) according to the state of the PV module.

In an embodiment of the present invention, the control unit may be configured to perform power line communication using the power generation efficiency optimization unit and the battery line.

Advantageous Effects

The present invention is designed to include an inverter in each of the power generation efficiency optimization units and directly connected to an AC line, thereby enabling power to be supplied to a power grid using other power generation efficiency optimization units that operate normally even when a failure occurs in a specific inverter.

In addition, the present invention is designed to connect a battery line to the power generation efficiency optimization units to directly charge a battery and perform power line communication with a controller through the battery line, thereby enabling energy to be charged to the battery even when a failure occurs in a part of a DC/DC converter.

DESCRIPTION OF DRAWINGS

FIG. 1 is a configuration diagram of a conventional photovoltaic power generation system.

FIG. 2 is a configuration diagram of a photovoltaic power generation system according to an embodiment of the present invention.

FIG. 3 is a configuration diagram of a power generation efficiency optimization unit in FIG. 2.

FIG. 4 is a configuration diagram of a photovoltaic power generation system according to another embodiment of the present invention.

[Description of Symbols]

| | |
|---|---|
| 10: PV module | 20: power generation efficiency optimization unit |
| 21: inverter | 25: converter |
| 30: controller | 31: control unit |
| 32: battery | 60: power grid |

MODES OF THE INVENTION

Hereinafter, in order to fully understand the configuration and effects of the present invention, preferred embodiments of the present invention will be described with reference to the accompanying drawings. However, the present invention is not limited to the embodiments disclosed below, and may be embodied in various forms and various modifications may be made. Rather, the description of the present invention is provided so that the present disclosure will be thorough and complete and will fully convey the scope of the invention to those of ordinary skill in the art. In the accompanying drawings, the size of the elements is enlarged compared to actual ones for the convenience of description, and the ratio of each element may be exaggerated or reduced.

Terms such as 'first' and 'second' may be used to describe various elements, but, the above elements should not be limited by the terms above. The above terms may be used only for the purpose of distinguishing one element from another. For example, without departing from the scope of the present invention, a 'first element' may be named a 'second element' and similarly, a 'second element' may also be named a 'first element.' In addition, expressions in the singular include plural expressions unless explicitly expressed otherwise in the context. Unless otherwise defined, terms used in the embodiments of the present invention may be interpreted as meanings commonly known to those of ordinary skill in the art.

FIG. 2 is a configuration diagram of a photovoltaic power generation system according to a preferred embodiment of the present invention.

Referring to FIG. 2, the photovoltaic power generation system of the present invention includes a plurality of PV modules 10, a plurality of power generation efficiency optimization units 20 connected to each of the plurality of PV modules 10 to optimize power generation efficiency and convert DC electric energy produced by the PV module 10 into AC and supply the same to a power grid 60 through an energy meter 50, and a controller 30 for checking and controlling monitoring information detected by the plurality of power generation efficiency optimization units 20.

Hereinafter, the configuration and operation of the photovoltaic power generation system of the present invention configured as described above will be described in more detail.

First, the number of PV modules 10 may be determined as necessary, and a power generation efficiency optimization unit 20 is added to each PV module 10.

The power generation efficiency optimization unit 20 may be implemented as MLPE (Module Level Power Electronics), and the configuration of the power generation efficiency optimization unit 20 suitable for the example of FIG. 2 is illustrated in FIG. 3.

That is, the power generation efficiency optimization unit 20 may include an inverter 21, a monitoring unit 23 for detecting information such as voltage, current, and temperature of the PV module 10, and a communication module unit 24 capable of providing the monitored information to the controller 30.

In addition, the power generation efficiency optimization unit may include a Rapid Shut Down (RSD) module 22 that quickly cuts off operations during a malfunction of equipment.

The communication module unit 24 may perform various types of communication with the controller 30, and serial communication may be used in addition to the characteristic power line communication of the present invention described later.

The power generation efficiency optimization unit 20 of the present invention may include an inverter 21, and thus, convert energy produced by the PV module 10 into AC energy by being supplied through the PV line 1, and then may supply it to the power grid 60 through the AC line 3.

In this case, the supply power is measured by the energy meter 50.

In the above-described structure, when a failure occurs in the inverter 21 of a specific power generation efficiency optimization unit 20, since other power generation efficiency optimization units 20 other than the power generation efficiency optimization 20 including the failed inverter 21 can normally convert power, it is possible to supply power to the power grid 60.

That is, in the related art, the DC electric energy of each power generation efficiency optimization unit is converted into AC power by using one inverter and supplied to the power grid, but the present invention has a characteristic in that the DC electric power produced by the PV module 10 is converted into AC power and directly supplied to the power grid 60 by each power generation efficiency optimization unit 20, and thus the power supply may be maintained even when an abnormality occurs in some inverters 21.

FIG. 4 is a configuration diagram of a photovoltaic power generation system according to another embodiment of the present invention.

Referring to FIG. 4, the present invention may further include a converter 25 for DC/DC conversion in each of the power generation efficiency optimization unit 20, and thus may convert DC power produced by the PV module 10 into DC power suitable for charging a battery 32 and may each charge the battery 32 as necessary.

In this case, the battery 32 is included in the controller 30.

Hereinafter, the configuration and operation of the photovoltaic power generation system according to another embodiment of the present invention configured as described above will be described in more detail.

The power generation efficiency optimization unit 20 further includes a converter 25 in the configuration described above with reference to FIG. 3. As described above, the power generation efficiency optimization unit 20 is implemented as an MLPE, and a function module may be added as necessary.

The converter 25 is a DC/DC converter, and converts power produced by each PV module 10 into power suitable for charging the battery 32.

That is, the power of the PV module 10 supplied through the PV line 1 is converted and directly supplied to the battery 32 through the battery line 2.

Accordingly, even when a failure occurs in the converter 25 included in some of the power generation efficiency optimization units 20, the battery 32 may be charged by the power generation efficiency optimization unit 20 including another normal converter 25.

In addition, the control unit 31 of the controller 30 may perform power line communication with the power generation efficiency optimization unit 20 through the battery line 2.

That is, communication through the battery line 2 is possible without connection of a separate communication line or expansion of the PV line, and thus the system may be easily installed, and the cost may be reduced.

In addition, the power line communication through the battery line 2 may also perform communication between the power generation efficiency optimization units 20, and thus various applications and expansions may be possible.

While embodiments according to the present invention have been described above, but these are only exemplary, and those of ordinary skill in the art may understand that various modifications and embodiments of equivalent scope are possible therefrom. Accordingly, the true technical protection scope of the present invention shall be determined according to the attached claims.

INDUSTRIAL APPLICABILITY

The present invention relates to a photovoltaic power generation system that optimizes power generation efficiency using natural laws and performs a predetermined operation even when a partial device malfunctions, and has industrial applicability.

The invention claimed is:

1. A photovoltaic power generation system, comprising:
   a plurality of PV modules;
   a power generation efficiency optimization unit corresponding to a corresponding one of the PV modules one-to-one, the power generation efficiency optimization unit including inverters and configured to convert power produced from the PV modules into AC power, and supply the converted power to a power grid through an AC line; and
   a controller configured to check and control monitoring information detected by the power generation efficiency optimization unit, the controller including battery configured to store the converted power supplied from the power generation efficiency optimization unit,
   wherein the power generation efficiency optimization unit includes
      a converter configured to convert power produced by a corresponding one of the PV modules and charge the converted power to a battery through a battery line, and
      a communication module unit configured to transmit the monitoring information to a control unit of the controller through power line communication using the battery line and perform communication between a plurality of the power generation efficiency optimization units including the power generation efficiency optimization unit.

2. The photovoltaic power generation system of claim 1, wherein
   the power generation efficiency optimization unit further comprises a monitoring unit configured to detect a state of the corresponding one of the PV-module; and modules, and
   the communication module unit is configured to transmit the monitoring information, which include the state of the corresponding one of the PV modules, detected by the monitoring unit to the control unit of the controller.

3. The photovoltaic power generation system of claim 2, wherein the power generation efficiency optimization unit further comprises an RSD module unit configured to perform rapid shut down (RSD) according to the state of the PV module.

* * * * *